United States Patent
Badejo

Patent Number: 5,728,206
Date of Patent: Mar. 17, 1998

[54] SURFACE-TREATED ORGANIC PIGMENTS

[75] Inventor: Ibraheem T. Badejo, N. Charleston, S.C.

[73] Assignee: Bayer Corporation, Pittsburgh, Pa.

[21] Appl. No.: 769,477

[22] Filed: Dec. 20, 1996

[51] Int. Cl.$^6$ ........................................... C08K 5/00
[52] U.S. Cl. ................................ 106/493; 106/31.75
[58] Field of Search ........................... 106/493, 31.75

[56] References Cited

U.S. PATENT DOCUMENTS

| | | | |
|---|---|---|---|
| 3,342,828 | 9/1967 | Vorobjeva | 260/294.7 |
| 4,238,386 | 12/1980 | Babler | 260/42.21 |
| 4,250,079 | 2/1981 | Babler | 260/42.21 |
| 4,588,576 | 5/1986 | David | 423/608 |
| 4,929,279 | 5/1990 | Hays | 106/412 |
| 5,362,780 | 11/1994 | Babler et al. | 524/88 |

FOREIGN PATENT DOCUMENTS

| | | |
|---|---|---|
| 227779 | 11/1985 | Czechoslovakia . |
| 0544441 | 11/1992 | European Pat. Off. . |
| 63-305172 | 12/1988 | Japan . |

OTHER PUBLICATIONS

W. Herbst & K. Hunger, Industrial Organic Pigments, New York: VCH Publishers Inc. 1993 (month unavailable) pages 205–207.

*Primary Examiner*—Deborah Jones
*Attorney, Agent, or Firm*—Joseph C. Gil; Richard E. L. Henderson

[57] ABSTRACT

This invention relates to a process for preparing pigment compositions comprising
(a) treating an organic pigment with
   (1) about 0.1 to about 100% by weight, relative to the organic pigment, of a tertiary alkyl primary amine having the formula (I)

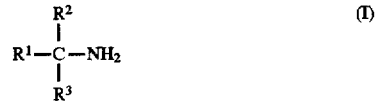

wherein
   $R^1$ is a $C_5$–$C_{30}$ (cyclo)aliphatic group, and
   $R^2$ and $R^3$ are independently $C_1$–$C_6$ alkyl,
   (2) 0 to about 100% by weight, relative to the organic pigment, of a surfactant, and
   (3) about 5 to about 15 parts by weight per part by weight of the organic pigment of a liquid in which the organic pigment is substantially insoluble,
thereby forming a suspension of the surface-treated pigment composition in the liquid; and
(b) collecting the pigment composition.

11 Claims, No Drawings

SURFACE-TREATED ORGANIC PIGMENTS

BACKGROUND OF THE INVENTION

This invention relates to a process for preparing pigment compositions having improved dispersibility, for example, in plastics and other macromolecular materials by surface treating organic pigments with certain tertiary alkyl primary amines and optional dispersants.

Surface treatment is a type of finishing in which certain auxiliaries, such as rosin or other resins, are applied to pigments to influence their surface structure and thus their physical and coloristic properties. E.g., W. Herbst and K. Hunger, *Industrial Organic Pigments* (New York: VCH Publishers, Inc., 1993), pages 205-207. Surface treatment is a particularly useful method for improving pigment dispersibility in inks, toners, paints, coatings, and plastics.

The use of amines or amine derivatives in the preparation of pigment dispersions is known. For example, Czech Patent 227,779 discloses a two-step process for dispersing organic pigments in inks by first dispersing the pigments in the presence of ampholytic sulfonates of $C_{12}$-$C_{24}$ fatty acids and then coagulating the dispersed pigments with hydrophobic alkyl amines or ethoxylated $C_{12}$-$C_{24}$ fatty acids. European Patent Application 544,441 discloses dispersions of organic pigments in which the pigment is treated with a non-polar additive and dispersed in a solution containing a polar additive, including certain rosin amines or multifunctional amines. However, these two patents, besides requiring two-step treatments using two different types of dispersants, do not disclose the use of tertiary alkyl primary amines, a critical feature of the present invention.

Japanese Patent 63/305,172 discloses the dispersion of organic pigments in inks in the presence of certain surfactants, including stearylamine and stearylpropyleneamine. This patent, however, does not disclose the treatment of organic pigments with tertiary alkyl primary amines, a critical feature of the present invention.

U.S. Pat. No. 4,929,279 discloses aqueous dispersions prepared by adding certain surfactants to an aqueous slurry of the pigment and then subjecting the treated pigment to ultrasonic irradiation. The surfactants include narrowly defined groups of diamines having two tertiary amino groups, two quaternary ammonium groups, or a combination of a secondary amino group with a primary amino group. This patent, however, does not disclose the treatment of organic pigments with tertiary alkyl primary amines, a critical feature of the present invention.

The use of tertiary alkyl primary amines according to the present invention provided pigment compositions having improved dispersibility, as well as improved storage stability when used in pigmented systems such as inks or paints. The presence of about 2% or more of a tertiary alkyl primary amine according to the invention also serves to reduce the viscosity of dispersions containing the pigment compositions of the invention.

SUMMARY OF THE INVENTION

This invention relates to a process for preparing pigment compositions comprising (a) treating an organic pigment with (1) about 0.1 to about 100% by weight (preferably 2 to 20% by weight, more preferably 5 to 20% by weight), relative to the organic pigment, of a tertiary alkyl primary amine having the formula (I)

wherein $R^1$ is a $C_5$-$C_{30}$ (cyclo)aliphatic group (preferably a $C_5$-$C_{22}$ aliphatic group), and $R^2$ and $R^3$ are independently $C_1$-$C_6$ alkyl (preferably methyl), (2) 0 to about 100% by weight, relative to the organic pigment, of a surfactant, and (3) about 5 to about 15 parts by weight (preferably 6 to 12 parts by weight) per part by weight of the organic pigment of a liquid in which the organic pigment is substantially insoluble, thereby forming a suspension of the surface-treated pigment composition in the liquid; and (b) collecting the pigment composition.

This invention further relates to pigment compositions prepared by the process of this invention and to the use of such pigment compositions in the pigmentation of plastics, coatings, fibers, printing inks (including ink jet inks), and the like.

DETAILED DESCRIPTION OF THE INVENTION

Suitable organic pigments for the process of the present invention include quinacridone, phthalocyanine, and perylene pigments, as well as other known organic pigments. Mixtures, including solid solutions, of such pigments are also suitable.

Quinacridone pigments are particularly suitable organic pigments. Quinacridones (which includes unsubstituted quinacridone, quinacridone derivatives, and solid solutions thereof) can be prepared by methods known in the art but are preferably prepared by thermally ring-closing various 2,5-dianilinoterephthalic acid precursors. E.g., S. S. Labana and L. L. Labana, "Quinacridones" in *Chemical Review*, 67, 1–18 (1967), and U.S. Pat. Nos. 3,157,659, 3,256,285, and 3,317,539. Suitable quinacridone pigments can be unsubstituted or substituted (for example, with one or more alkyl, alkoxy, halogens such as chlorine, or other substituents typical of quinacridone pigments).

Metal phthalocyanine pigments are also suitable organic pigments. Although copper phthalocyanines are preferred, other metal-containing phthalocyanine pigments, such as those based on zinc, cobalt, iron, nickel, and other such metals, may also be used. Suitable phthalocyanine pigments can be unsubstituted or partially substituted (for example, with one or more alkyl, alkoxy, halogens such as chlorine, or other substituents typical of phthalocyanine pigments).

Perylenes, particularly the diimides and dianhydrides of perylene-3,4,9,10-tetracarboxylic acid, are also suitable organic pigments. Suitable perylene pigments can be unsubstituted or substituted (for example, with one or more alkyl, alkoxy, halogens such as chlorine, or other substituents typical of perylene pigments).

Other suitable organic pigments include dioxazines (that is, triphenedioxazines), 1,4-diketopyrrolopyrroles, anthrapyrimidines, anthanthrones, flavanthrones, indanthrones, isoindolines, isoindolinones, perinones, pyranthrones, thioindigos, 4,4'-diamino-1,1'-dianthraquinonyl, and azo compounds, as well as substituted derivatives.

The organic pigment is first mixed in step (a) with a tertiary alkyl primary amine and any optional surfactants in a liquid in which the organic pigment is substantially insoluble.

Suitable tertiary alkyl primary amines (a)(1) are amines having formula (I)

wherein $R^1$, $R^2$, and $R^3$ have the meanings given above.

The term "$C_1$–$C_6$ alkyl" refers to straight or branched chain aliphatic hydrocarbon groups having from 1 to 6 carbon atoms. Examples of $C_1$–$C_6$ alkyl are methyl, ethyl, propyl, butyl, pentyl, hexyl, and the isomeric forms thereof. The $R^2$ and $R^3$ groups, however, should not be branched at the carbon atom attached to the C-$NH_2$ moiety.

The term "$C_5$–$C_{30}$ (cyclo)aliphatic" as used herein refers to branched and unbranched, saturated and unsaturated aliphatic groups, as well as groups consisting of or containing cycloaliphatic groups, having 5 to 30 carbon atoms. The $R^1$ group, however, is preferably not branched or unsaturated at the carbon atom attached directly to the C-$NH_2$ moiety. Examples of suitable $C_5$–$C_{30}$ (cyclo)aliphatic groups include $C_5$–$C_{30}$ alkyl, $C_5$–$C_{30}$ alkenyl, $C_5$–$C_{30}$ alkadienyl, $C_5$–$C_{30}$ alkatrienyl, as well as the isomeric branched forms thereof, and $C_5$–$C_8$ cycloalkyl, $C_5$–$C_8$ cycloalkenyl, and $C_5$–$C_8$ cycloalkadienyl. Examples of suitable $C_5$–$C_{30}$ (cyclo)aliphatic groups also include alkyl, alkenyl, alkadienyl, and alkatrienyl groups in which the main chain is interrupted with one or more $C_5$–$C_8$ cycloalkylene, $C_5$–$C_8$ cycloalkenylene, or $C_5$–$C_8$ cycloalkadienylene groups as long as the number of carbon atoms totals no more than 30 carbon atoms. Although generally not preferred, it is also possible to include (cyclo)aliphatic groups in which one or more of the (cyclo)aliphatic carbon atoms is substituted with halogen (such as fluorine or chlorine), $C_1$–$C_6$ alkoxy, or $C_6$–$C_{10}$ aromatic hydrocarbon (preferably phenyl or naphthyl) that can itself optionally be substituted. It is also possible, but much less preferred, to replace one or more non-adjacent (cyclo)aliphatic carbon atoms with an oxygen or sulfur atom or an $NR^a$ group (in which $R^a$ is $C_1$–$C_6$ alkyl or $C_6$–$C_{10}$ aryl). It is even possible to replace one or more non-adjacent aliphatic chain carbon atoms of the $R^1$ group with an aromatic ring, such as a benzene ring (although the resultant group would not in a formal sense be an "aliphatic" group). In general, the preferred tertiary alkyl primary amines are those in which the $R^1$ group is an acyclic aliphatic groups having from 5 to 22 carbon atoms.

The term "$C_5$–$C_{30}$ alkyl" as used for the $R^1$ group refers to alkyl groups having from 5 to 30 carbon atoms, such as pentyl, hexyl, lauryl (i.e., dodecyl), myristyl (i.e., tetradecyl), cetyl (i.e., hexadecyl), stearyl (i.e., octadecyl), eicosanyl, docosanyl, and isomeric forms thereof. The terms "$C_5$–$C_{30}$ alkenyl", "$C_5$–$C_{30}$ alkadienyl", and "$C_5$–$C_{30}$ alkatrienyl" refer to corresponding unsaturated groups having one, two, and three carbon-carbon double bonds, respectively.

The term "$C_5$–$C_8$ cycloalkyl" refers to cycloaliphatic hydrocarbon groups having from 5 to 8 carbon atoms. Examples of $C_5$–$C_7$ cycloalkyl are cyclopentyl, cyclohexyl, cycloheptyl, and cyclooctyl. The terms "$C_5$–$C_8$ cycloalkenyl" and "$C_5$–$C_8$ cycloalkadienyl" refer to corresponding unsaturated cyclic groups having one and two carbon-carbon double bonds, respectively. The terms "$C_5$–$C_8$ cycloalkylene", "$C_5$–$C_8$ cycloalkenylene", and "$C_5$–$C_8$ cycloalkadienylene" refer to the corresponding difunctional cycloaliphatic groups.

The term "$C_1$–$C_6$ alkoxy" refers to straight or branched chain alkyl oxy groups having from 1 to 6 carbon atoms. Examples of $C_1$–$C_6$ alkoxy are methoxy, ethoxy, propoxy, butoxy, pentyloxy, hexyloxy, and the isomeric forms thereof.

The term "$C_6$–$C_{10}$ aromatic hydrocarbon" refers to phenyl and 1- or 2-naphthyl, as well as phenyl and naphthyl groups substituted with $C_1$–$C_6$ alkyl, $C_1$–$C_6$ alkoxy, or halogen.

Examples of suitable halogen are fluorine, chlorine, and bromine.

Suitable tertiary alkyl primary amines for use as component (a)(1) are available commercially under the name PRIMENE from Rohm and Haas Company (Philadelphia, Pa.).

Suitable surfactants (a)(2) include non-ionic, cationic, zwitterionic, amphoteric, and anionic surfactants known in the art. The preferred surfactants are anionic surfactants containing carboxylate, sulfonate, phosphate, or phosphonate groups, either as the free acids or as the alkali metal, alkaline earth metal, or ammonium salts (especially the sodium or potassium salts). Particularly preferred anionic surfactants are sulfosuccinates, sulfosuccinamates, and derivatives thereof. Examples of suitable sulfosuccinates are disodium sulfosuccinate, sodium diamyl sulfosuccinate, sodium dibutyl sulfosuccinate, sodium diisobutyl sulfosuccinate, dihexyl sulfosuccinate, sodium dihexyl sulfosuccinate, dioctyl sulfosuccinate, sodium dioctyl sulfosuccinate, sodium diisooctyl sulfosuccinate, disodium isodecyl sulfosuccinate, bis(tridecyl) sulfosuccinate, sodium bis(tridecyl) sulfosuccinate, lauric sulfosuccinate, disodium lauryl sulfosuccinate, diammonium lauryl sulfosuccinate, sodium dicyclohexyl sulfosuccinate, other sodium alkylsulfosuccinates and disodium (cyclo)-alkylsulfosuccinates, disodium laureth sulfosuccinate, lauryl ether sulfosuccinate, disodium lauramido-ethanolamine sulfosuccinate, sodium sulfosuccinate ester of lauric diethanolamide, disodium lauramido-isopro-panolamine sulfosuccinate, oleic sulfosuccinate, ricinoleic sulfosuccinate, disodium oleth-3-sulfosuccinate, disodium oleamido-ethanolamine sulfosuccinate, disodium oleamido-isopropanolamine sulfosuccinate, disodium mono-oleamido PEG-2 sulfosuccinate, coconut sulfosuccinate, disodium cocamido-isopropanolamine sulfosuccinate, the ethoxylated alcohol half ester of disodium sulfosuccinate, disodium nonoxynol-10-sulfosuccinate, and disodium mono- and didodecyl-diphenyloxide disulfonate. Examples of suitable sulfosuccinamates are disodium N-octadecylsulfosuccinamate and other N-alkyl- and N-dialkyl sulfosuccinamates and tetrasodium N-(1,2-dicarboxyethyl)-N-octadecyl sulfosuccinamate. These and other surfactants are commercially available, for example, under the names AEROSOL and SOLUSOL (Cytec Industries, Inc., West Paterson, N.J.), ARYLENE (Huntsman Corp., Houston, Tex.), ASTROMID and ASTROWET (Alco Chemical Corp., Chattanooga, Tenn.), EMCOL and VARSULF (Witco Corp., Greenwich, Conn.), ERINAL and IRGASOL (Ciba-Geigy Corp., Greensboro, N.C.), FOAMPOL (Alzo Inc., Matawan, N.J.), GEMTEX (Finetex Inc., Elmwood Park, N.J.), GEROPON (Rhone-Poulenc Inc., Cranbury, N.J.), HAROL (Graden Corp., Havertown, Pa.), INCROSUL (Croda, Inc., Parsippany, N.J.), MACKANATE (McIntyre Chemical, University Park, Ill.), MONAMATE and MONAWET (Mona Industries Inc., Paterson, N.J.), NAXAF (Ruetgers-Nease Corp., State College, Pa.), PROTOWET (Sybron Chemical Inc., Wellford, S.C.), TEXAPON (Henkel Corp., Cincinnati, Ohio), TRITON (Union Carbide Corp., Danbury, Conn.), and VULTAMOL (BASF Corporation, Mount Olive, N.J.).

Other suitable anionic dispersants include neodecanoic acid (Exxon Chemical, Baton Rouge, La.), sodium N-methyl-N-oleoyl taurate (Finetex Inc., Elmwood Park, N.J.), sulfonated aliphatic polyesters, and an aromatic sulfonate dispersant available as K-Sperse dispersant (King Industries, Norwalk, Conn.).

Suitable nonionic surfactants include ethoxylated fatty acids and amides, ethoxylated alcohols, ethoxylated alkylphenols, and glycol esters. Suitable cationic surfactants include ethoxylated and/or propoxylated amines, diamines, and quaternary ammonium salts. Suitable amphoteric and zwitterionic surfactants include amine oxides and betaine derivatives.

Mixtures of surfactants are, of course, also suitable.

Surface treatment step (a) is carried in a liquid (a)(3) in which the organic pigment is substantially insoluble, preferably water, a water-miscible organic liquid (such as methanol, or other lower aliphatic alcohols), or mixtures thereof. It is desirable, but not necessary, for tertiary alkyl primary amines (a)(1) to be at least partly insoluble in liquid (a)(3). Surfactants (a)(2) are often soluble in liquid (a)(3) but solubility is not an essential feature. Suitable liquids include water and/or water-miscible organic liquids, including, for example, lower aliphatic alcohols, such as methanol; ketones and ketoalcohols, such as acetone, methyl ethyl ketone, and diacetone alcohol; amides, such as dimethylformamide and dimethylacetamide; ethers, such as tetrahydrofuran and dioxane; alkylene glycols and triols, such as ethylene glycol and glycerol; and other such organic liquids known in the art. Other organic liquids can be used but are generally less preferred.

The temperature at which surface treatment is carried out is generally not critical but is usually maintained between about 5° C. and about 200° C. Temperatures between 5° C. and the boiling point of the mixture (which may be under pressure) are generally preferred.

During or immediately following step (a) the pigment composition can optionally be subjected to cavitating conditions using any known method (preferably using ultrasound). E.g., U.S. Pat. Nos. 4,588,576 and 4,929,279. Ultrasonic irradiation can be provided by any conventional system in which an appropriate vessel is equipped with a source of high frequency vibrations, such as a piezoelectric, mechanical, or magneto-restrictive acoustic generator at sound frequencies ranging from about 15 to about 20,000 kilohertz. Temperatures are generally not critical but are usually between about 5° C. and about 80° C. and, for safety reasons, are preferably kept well below the boiling point of the liquid medium.

The resultant pigment is collected in step (b) by methods known in the art but is preferably collected by filtration followed by washing to remove residual acid. Other collection methods known in the art, such as centrifugation or even simple decantation, are suitable but generally less preferred. The pigment is then dried for use or for further manipulation before use.

The pigments of this invention are highly water-resistant, oil-resistant, acid-resistant, lime-resistant, alkali-resistant, solvent-resistant, fast to over-lacquering, fast to over-spraying, fast to sublimation, heat-resistant, and resistant to vulcanizing, yet give a very good tinctorial yield and are readily dispersible (for example, in plastic materials). Because of their light stability and migration properties, the pigments according to the present invention are suitable for many different pigment applications. For example, pigments prepared according to the invention can be used as the colorant (or as one of two or more colorants) for lightfast pigmented systems.

The pigments of the present invention are particularly suitable for use with macromolecular materials, especially synthetically produced macromolecular substances. Examples of synthetic macromolecular substances include plastic materials, such as polyvinyl chloride, polyvinyl acetate, and polyvinyl propionate; polyolefins, such as polyethylene and polypropylene; high molecular weight polyamides; polymers and copolymers of acrylates, methacrylates, acrylonitrile, acrylamide, butadiene, or styrene; polyurethanes; and polycarbonates. Other suitable macromolecular substances include those of a natural origin, such as rubber; those obtained by chemical modification, such as acetyl cellulose, cellulose butyrate, or viscose; or those produced synthetically, such as polymers, polyaddition products, and polycondensates. The materials pigmented with the pigments of the invention can have any desired shape or form.

The pigments of the present invention are also suitable for pigmented mixtures with other materials, pigment formulations, paints, printing ink, and colored paper. The term "mixtures with other materials" is understood to include, for example, mixtures with inorganic white pigments, such as titanium dioxide (rutile) or cement, or other inorganic pigments. Examples of pigment formulations include flushed pastes with organic liquids or pastes and dispersions with water, dispersants, and, if appropriate, preservatives. Examples of paints in which pigments of this invention can be used include, for example, physically or oxidatively drying lacquers, stoving enamels, reactive paints, two-component paints, solvent- or water-based paints, emulsion paints for weatherproof coatings, and distempers. Printing inks include those known for use in paper, textile, and tinplate printing.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Quinacridones

The following quinacridone pigments were used as starting materials for the Examples:

Quinacridone (beta form), 2,9-dimethylquinacridone, and 2,9-dichloroquinacridone were prepared according to the method described in U.S. Pat. No. 3,342,828 and obtained in crude presscake form by drowning the reaction mixtures in methanol. The resultant crude pigments were collected but not conditioned or surface treated.

A solid solution containing 75% 2,9-dimethylquinacridone and 25% quinacridone was similarly prepared using mixtures of the appropriate unsubstituted and methyl-substituted 2,5-dianilinoterephthalic acid precursors. The resultant crude pigment solid solution was collected and finished by slurrying in water/methanol at a pH above 9, heat treating at 115–120° C., and isolating the finished. The finished pigment solid solution was not surface treated.

The following commercially available pigments were used as comparison standards:

Standard A 2,9-Dimethylquinacridone available as QUINDO® Magenta RV-6832 from Bayer Corporation Standard B Solid solution of 75% of 2,9-dimethylquinacridone and 25% of quinacridone available as QUINDO® Magenta RV-6825 from Bayer Corporation Standard C 2,9-Dichloroquinacridone available as QUINDO® Magenta RV-6863 from Bayer Corporation Standard D 2,9-Dichloroquinacridone available as MONASTRAL® Magenta RT-235-D from Ciba-Geigy Corp.

Standard E Quinacridone available as QUINDO® Magenta RV-6911 from Bayer Corporation Tertiary alkyl primary amines The following tertiary alkyl primary amines according to the invention were used in the Examples:

t-Amine A A tertiary $C_{16}$–$C_{22}$ amine available as PRIMENE® JM-T from Rohm and Haas Company, Philadelphia, Pa.

t-Amine B A tertiary $C_{12}$–$C_{14}$ amine available as PRIMENE® 81-R from Rohm and Haas Company, Philadelphia, Pa.

t-Amine C A tertiary octylamine containing 99% 1,1,3,3-tetramethyl-butylamine (available as PRIMENE® TOA from Rohm and Haas Company, Philadelphia, Pa.

Dispersibility in PVC

Dispersibilities of pigments prepared according to the examples were determined in polyvinyl chloride ("PVC") using untreated pigments and/or commercially available pigments for comparison. Dispersibility was evaluated by comparing hot-milled and cold-milled color development according to the following procedure. For each sample tested, a 50 g portion of flexible PVC was added to a hot (155° C.) two-roll mill having a nip thickness of 25 mils (ca. 0.6 mm) and fluxed until uniform. A 0.050 g portion of the test pigment or comparison pigment was sprinkled into the nip over a period of about ten seconds, after which the fluxed material was cut and rolled on the mill for five minutes. The pigmented sheet was then removed from the mill and placed on a clean flat surface to cool. A piece cut from the resultant sheet and allowed to cool to room temperature was used as the "hot-milled" sample for evaluation. A sample cut from the same sheet while still warm was placed on a cold (24° C.) two-roll mill having a nip thickness of 21 mils (ca. 0.5 mm), then folded and passed through the mill seven times. The cold-rolled sheet was again fluxed in the hot mill until smooth. A sample cut from the resultant sheet was used as the "cold-milled" sample for evaluation. Color development was evaluated using a scale of 1 to 5 based on the difference between hot-milled and cold-milled color development, where 1 represents poor dispersibility (as evidenced by extreme differences in color development) and 5 represents excellent dispersibility (as evidenced by essentially no difference in color development).

Solvent-based paint tests

Solvent-based paint tests were carried out using a generic alkyd melamine paint system. Pigment dispersions were prepared using a mixture of 33% AROPLAZ® 1453-X-50 alkyd resin (Reichhold Chemicals, Inc.), 63% xylene, and 4% pigment, which gave a pigment-to-binder ratio of 4:33 and a total solids content of 37%. The pigment-to-binder ratio was reduced 1:10 by addition of 2.3% AROPLAZ® 1453-X-50 alkyd resin and 6.5% RESIMENE® 717 melamine resin (Monsanto Company), which gave a total solids content of 40%. Masstone and transparency measurements were made using films applied at 152 µm and 38 µm wet film thickness, respectively, and flashed at room temperature for 30 minutes and at 121° C. for 30 minutes.

Undertone tint paints were prepared from the dispersion described above having a pigment-to-binder ratio of 4:33 by adding 31% of a dispersion prepared from 30% AROPLAZ® 1453-X-50 alkyd resin, 20% xylene, 5% NUOSPERSE® 657 (Hüls America), and 50% TI-PURE® R-960 $TiO_2$ pigment (DuPont); 21% AROPLAZ® 1453-X-50 alkyd resin; and 7% RESIMENE® 717 melamine resin, which gave a pigment-to-binder ratio of 1:2, a total solids content of 50%, and a $TiO_2$-to-pigment ratio of 90:10. Color measurements were made using films applied at 76 µm wet film thickness and flashed at room temperature for 30 minutes and at 121° C. for 30 minutes.

Metallic paints were prepared from the dispersion described above having a pigment-to-binder ratio of 4:33 using an aluminum paste (available as 5251 AR from Silberline Manufacturing Co., Inc.), AROPLAZ® 1453-X-50 alkyd resin, and RESIMENE® 717 melamine resin in quantities that provided a pigment-to-binder ratio of 1:9, an aluminum-to-pigment ratio of 20:80, and a total solids content of 41%. Color measurements were made using films applied at 76 µm wet film thickness and flashed at room temperature for 30 minutes and at 121° C. for 30 minutes.

Water-based paint tests

Water-based paints tests were carried out using a waterborne basecoat/solvent-borne clearcoat paint system. Aqueous dispersions were prepared using a mixture of 12.4% AROLON® 559-G4-70 acrylic resin (Reichhold Chemicals, Inc.), 3.2% SOLSPERSE® 27000 hyper-dispersant (Zeneca, Inc.), 1.6% 2-amino-2-methyl-1-propanol (Angus Chemical), and 18% pigment, which gave a pigment-to-binder ratio of 18:12 and a total solids content of 30%. The pigment-to-binder ratio was then reduced to 10:40 with additional AROLON® 559-G4-70 acrylic resin (total amount 26%) and 25% CYMEL® 325 melamine/formaldehyde resin (Cytec Industries), which gave a total solids content of 50%. Masstone and transparency measurements were made using films applied at 76 µm and 38 µm wet film thickness, respectively, and allowed to stand at room temperature for fifteen minutes and at 100° C. for five minutes. Clearcoats containing a mixture of 80% of AROPLAZ® 1453-X-50 alkyd resin (Reichhold Chemicals, Inc.) and 20% CYMEL® 325 melamine/formaldehyde resin at a total solids level of 57% were then applied over the basecoat at a 76 µm wet film thickness allowed to stand at room temperature for fifteen minutes and at 121° C. for fifteen minutes.

Undertone tint paints were prepared from the reduced aqueous dispersions described above having a pigment-to-binder ratio of 10:40 by adding additional AROLON® 559-G4-70 acrylic resin, CYMEL® 325 melamine/formaldehyde resin, and 35% TINT-AYD® CW-5003 white dispersion (Daniel Products Company), which gave a pigment-to-binder ratio of 1:1.1, a total solids content of 55%, and a $TiO_2$-to-pigment ratio of 90:10. Color measurements were made using films applied at 38 µm wet film thickness and allowed to stand at room temperature for fifteen minutes and at 100° C. for five minutes. Clearcoats were then applied and baked as described above.

Metallic paints were prepared from the dispersion described above having a pigment-to-binder ratio of 18:12 using a water-dispersible aluminum pigment (available as HYDRO PASTE® 8726 from Silberline Manufacturing Co., Inc.), AROLON® 559-G4-70 acrylic resin, and CYMEL® 325 melamine/formaldehyde resin in quantities that provided a pigment-to-binder ratio of 1:2, an aluminum-to-pigment ratio of 20:80, and a total solids content of 43%. Color measurements were made using films applied at 38

µm wet film thickness and baked as described above. Clearcoats were then applied and baked as described above.

Example 1 (comparison)

Crude 2,9-dimethylquinacridone presscake (120.0 g, corresponding to 25.0 g of 100% strength pigment) was reslurried in 155.0 g of water. The slurry was heated at 140°–145° C. for two hours in a laboratory Parr reactor. The mixture was allowed to cool to room temperature and the pH was adjusted to 3.4. The slurry was stirred at 60° C. for 30 minutes, after which the resultant slurry was filtered and washed with water. The wet presscake was dried in the oven at 60° C. overnight to yield 25.0 g of a magenta (i.e., red-violet) pigment not having a surface treatment.

Example 2

Crude 2,9-dimethylquinacridone presscake (120.0 g, corresponding to 25.0 g of 100% strength pigment) was reslurried in 155.0 g of water and 5.0 g of t-Amine A. The slurry was heated at 140°–145° C. for two hours in a laboratory Parr reactor. The mixture was allowed to cool to room temperature and the pH was adjusted to 3.4. The slurry was stirred at 60° C. for 30 minutes, after which the resultant slurry was filtered and washed with water. The wet presscake was dried in the oven at 60° C. overnight to yield 27.8 g of a magenta pigment having a good dispersibility in PVC, as shown in Table 1.

TABLE 1

Dispersibilities in PVC for the 2,9-Dimethylquinacridone Pigments of Comparison Example 1 and Example 2

| Test Sample | Dispersibility |
| --- | --- |
| Example 1 (comparison) | 1 |
| Example 2 | 2–3 |

Example 3

Crude 2,9-dimethylquinacridone presscake (120.0 g, corresponding to 25.0 g of 100% strength pigment) was reslurried in 155.0 g of water and 5.0 g of t-Amine A. The slurry was heated at 140°–145° C. for two hours in a laboratory Parr reactor. The mixture was allowed to cool to room temperature and the pH was adjusted to 3.4. An emulsion of 0.9 g of an anionic sulfosuccinate surfactant and 13.1 g of petroleum distillate in water was added and the mixture was stirred at 50° C. for three hours. The resultant slurry was filtered and washed with water. The wet presscake was dried in the oven at 60° C. overnight to yield 29.3 g of a magenta pigment having a good dispersibility in PVC, as shown in Table 2.

TABLE 2

Dispersibility in PVC for the 2,9-Dimethylquinacridone Pigment of Example 3

| Test Sample | Dispersibility |
| --- | --- |
| Example 3 | 3 |
| Standard A | 1–2 |

Example 4

Crude 2,9-dimethylquinacridone presscake (120.0 g, corresponding to 25.0 g of 100% strength pigment) was reslurried in 155.0 g of water and 2.5 g of t-Amine A. The slurry was heated at 140°–145° C. for two hours in a laboratory Parr reactor and allowed to cool to room temperature. After 5 g of an anionic aromatic sulfonate surfactant was added, the resultant mixture was stirred at 60° C. for one hour and allowed to cool to 30° C. The resultant slurry was filtered and washed with water. The wet presscake was dried in the oven at 60° C. overnight to yield 32 g of a magenta pigment having a good dispersibility in PVC, as shown in Table 3.

TABLE 3

Dispersibility in PVC for the 2,9-Dimethylquinacridone Pigment of Example 4

| Test Sample | Dispersibility |
| --- | --- |
| Example 4 | 3 |
| Standard A | 1–2 |

Example 5

Crude 2,9-dimethylquinacridone presscake (67.5 g, corresponding to 19.0 g of 100% strength pigment) was reslurried in 140.0 g of water and 1.0 g of t-Amine B. The slurry was heated at 140°–145° C. for two hours in a laboratory Parr reactor. The mixture was allowed to cool to room temperature and the pH was adjusted to 3.2. An emulsion of 1.2 g of an anionic sulfosuccinate surfactant and 16.2 g of petroleum distillate in water was added and the mixture was stirred at 50° C. for three hours. The resultant slurry was filtered and washed with water. The wet presscake was dried in the oven at 60° C. overnight to yield 19.5 g of a magenta pigment having a good dispersibility in PVC, as shown in Table 4.

TABLE 4

Dispersibility in PVC for the 2,9-Dimethylquinacridone Pigment of Example 5

| Test Sample | Dispersibility |
| --- | --- |
| Example 5 | 3–4 |
| Standard A | 1–2 |

Example 6

A sample (150.0 g, corresponding to 50.0 g of 100% strength pigment) of a solid solution presscake containing 75% 2,9-dimethylquinacridone and 25% quinacridone that has been finished but not surface treated was reslurried in 650.0 g of water and 5.0 g of t-Amine A. The slurry was heated at 60° C. for one hour and allowed to cool to 50° C. After the pH was adjusted to 3.4, the slurry was heated at 60° C. for one hour. The resultant slurry was filtered and washed with water. The wet presscake was dried in the oven at 60° C. overnight to yield 54.0 g of a magenta pigment having a good dispersibility in PVC, as shown in Table 5.

TABLE 5

Dispersibility in PVC for the Solid Solution Pigment of Example 6

| Test Sample | Dispersibility |
| --- | --- |
| Example 6 | 2–3 |
| Standard B | 1–2 |

Example 7

A sample (150.0 g, corresponding to 50.0 g of 100% strength pigment) of a solid solution presscake containing 75% 2,9-dimethylquinacridone and 25% quinacridone that has been finished but not surface treated was reslurried in 650.0 g of water and 5.0 g of t-Amine A. The slurry was heated at 60° C. for one hour and allowed to cool to 50° C. After the pH was adjusted to 3.4, the slurry was heated at 60° C. for one hour. An emulsion of 2.5 g of an anionic sulfosuccinate surfactant and 30.0 g of petroleum distillate in water was added and the mixture was stirred at 50° C. for three hours. The resultant slurry was filtered and washed with water. The wet presscake was dried in the oven at 60° C. overnight to yield 52.1 g of a magenta pigment having a good dispersibility in PVC, as shown in Table 6.

TABLE 6

Dispersibility in PVC for the Solid Solution Pigment of Example 7

| Test Sample | Dispersibility |
| --- | --- |
| Example 7 | 3–4 |
| Standard B | 1–2 |

Example 8

Crude 2,9-dichloroquinacridone presscake (200.0 g, corresponding to 66.7 g of 100% strength pigment) was reslurried in 470.0 g of water and 12.0 g of t-Amine A. The slurry was heated at 140°–145° C. for two hours in a laboratory Parr reactor. The mixture was allowed to cool to room temperature and the pH was adjusted to 3.2. The slurry was stirred at 60° C. for 60 minutes, after which the resultant slurry was filtered and washed with water. The wet presscake was dried in the oven at 60° C. overnight to yield 69.2 g of a magenta pigment having a good dispersibility in PVC, as shown in Table 7 (which also shows data for a comparison pigment prepared in the same way without using t-Amine A).

TABLE 7

Dispersibilities in PVC for the 2,9-Dichloroquinacridone Pigment of Example 8

| Test Sample | Dispersibility |
| --- | --- |
| Example 8 | 3–4 |
| Comparison | 1–2 |

Example 9

Crude 2,9-dichloroquinacridone presscake (50.0 g, corresponding to 16 g of 100% strength pigment) was reslurried in 150.0 g of water and 3.2 g of t-Amine A. The slurry was heated at 140°–145° C. for two hours in a laboratory Parr reactor. The mixture was allowed to cool to room temperature and the pH was adjusted to 3.2. An emulsion of 1.3 g of an anionic sulfosuccinate surfactant and 18 g of petroleum distillate in water was added and the mixture was stirred at room temperature for three hours. The resultant slurry was filtered and washed with water. The wet presscake was dried in the oven at 60° C. overnight to yield 16.6 g of a magenta pigment having a good dispersibility in PVC, as shown in Table 8.

TABLE 8

Dispersibility in PVC for the 2,9-Dichloroquinacridone Pigment of Example 9

| Test Sample | Dispersibility |
| --- | --- |
| Example 9 | 4–5 |
| Standard C | 3–4 |
| Standard D | 3–4 |

Example 10

Crude quinacridone presscake (150.0 g, corresponding to 50.0 g of 100% strength pigment) was reslurried in 255.0 g of water and 9.0 g of t-Amine A. The slurry was heated at 140°–145° C. for two hours in a laboratory Parr reactor. The mixture was allowed to cool to room temperature and the pH was adjusted to 3.3. The slurry was stirred at 60° C. for 60 minutes, after which the resultant slurry was filtered and washed with water. The wet presscake was dried in the oven at 60° C. overnight to yield 52.9 g of a violet pigment having a good dispersibility in PVC, as shown in Table 9. The pigment also exhibited improved storage stability in a water-based latex paint system (as indicated by an essentially constant viscosity after stirring for two weeks at about 50° C.).

TABLE 9

Dispersibility in PVC for the Quinacridone Pigment of Example 10

| Test Sample | Dispersibility |
| --- | --- |
| Example 10 | 3–4 |
| Standard E | 2–3 |

Example 11

Crude quinacridone presscake (50.0 g, corresponding to 18.3 g of 100% strength pigment) was reslurried in 145.0 g of water and 3.0 g of t-Amine A. The slurry was heated at 140°–145° C. for two hours in a laboratory Parr reactor. The mixture was allowed to cool to room temperature and the pH was adjusted to 3.2 with phosphoric acid. An emulsion of 0.65 g of an anionic sulfosuccinate surfactant and 9 g of petroleum distillate in water was added and the mixture was stirred at room temperature for three hours. The resultant slurry was filtered and washed with water. The wet presscake was dried in the oven at 60° C. overnight to yield 19.5 g of a violet pigment having a good dispersibility in PVC, as shown in Table 10.

TABLE 10

Dispersibility in PVC for the Quinacridone Pigment of Example 11

| Test Sample | Dispersibility |
| --- | --- |
| Example 11 | 4–5 |
| Standard E | 2–3 |

Example 12

Crude 2,9-dimethylquinacridone presscake (160.0 g, corresponding to 40.0 g of 100% strength pigment) was reslurried in 310.0 g of water and 4.0 g of t-Amine B. The slurry was heated at 140°–145° C. for two hours in a laboratory Parr reactor. The mixture was allowed to cool to room temperature and the resultant slurry was filtered and washed with water. The wet presscake was dried in the oven at 60° C. overnight to yield 44.0 g of a magenta pigment.

Water-based and solvent-based paints prepared as described above exhibited no improvement compared to water-based and solvent-based paints prepared using Standard A.

Example 13

Crude 2,9-dimethylquinacridone presscake (160.0 g. corresponding to 40.0 g of 100% strength pigment) was reslurried in 310.0 g of water and 4.0 g of t-Amine B. The slurry was heated at 140°–145° C. for two hours in a laboratory Parr reactor. The mixture was allowed to cool to room temperature and the pH was adjusted to 3.4 with phosphoric acid. An emulsion of 1.75 g of an anionic sulfosuccinate surfactant and 23.0 g of petroleum distillate in water was added and the mixture was stirred at 45° C. for three hours. The resultant slurry was filtered and washed with water. The wet presscake was dried in the oven at 60° C. overnight to yield 46.0 g of a magenta pigment.

Water-based and solvent-based paints prepared as described above exhibited a more chromatic tint and increased metallic brightness compared to water-based and solvent-based paints prepared using Standard A and the pigment of Example 12.

Example 14

Crude copper phthalocyanine presscake (Pigment Blue 15:1 containing 13.5% chlorine) (266.0 g, corresponding to 40.0 g of 100% strength pigment) was reslurried in 375.0 g of water. The pH was adjusted to 4.4 after which was sequentially added with stirring 4.0 g of neodecanoic acid and 3.0 g of t-Amine C. The slurry was heated to 130°–135° C. for one hour in a laboratory Parr reactor. The mixture was allowed to cool to room temperature, after which the resultant slurry was filtered and washed with water. The wet presscake was dried in the oven at 60° C. overnight to yield 45.0 g of a blue pigment.

What is claimed is:

1. A process for preparing a pigment composition comprising
   (a) treating an organic pigment with
      (1) about 0.1 to about 100% by weight, relative to the organic pigment, of a tertiary alkyl primary amine having the formula

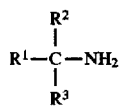

wherein
   $R^1$ is a $C_5$–$C_{30}$ (cyclo)aliphatic group, and
   $R^2$ and $R^3$ are independently $C_1$–$C_6$ alkyl,
   (2) 0 to about 100% by weight, relative to the organic pigment, of a surfactant, and
   (3) about 5 to about 15 parts by weight per part by weight of the organic pigment of a liquid in which the organic pigment is substantially insoluble,
   thereby forming a suspension of the surface-treated pigment composition in the liquid; and
(b) collecting the pigment composition.

2. A process according to claim 1 wherein the organic pigment is treated with 2 to 20% by weight relative to the organic pigment, of the tertiary alkyl primary amine.

3. A process according to claim 1 wherein the tertiary alkyl primary amine is a compound having the formula

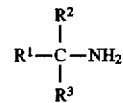

wherein $R^1$ is a $C_5$–$C_{22}$ aliphatic group, and $R^2$ and $R^3$ are methyl.

4. A process according to claim 1 wherein 6 to 12 parts by weight per part by weight of the organic pigment of liquid (a)(3) is used.

5. A process according to claim 1 wherein liquid (a)(3) in which the organic pigment is water, a water-miscible organic liquid, or a mixture thereof.

6. A process according to claim 1 wherein the pigment composition is collected by filtration.

7. A process according to claim 1 wherein the organic pigment is a quinacridone pigment or a metal phthalocyanine pigment.

8. A pigment composition prepared according to a process comprising
   (a) treating an organic pigment with
      (1) about 0.1 to about 100% by weight, relative to the organic pigment, of a tertiary alkyl primary amine having the formula

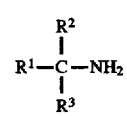

wherein
   $R^1$ is a $C_5$–$C_{30}$ (cyclo)aliphatic group, and
   $R^2$ and $R^3$ are independently $C_1$–$C_6$ alkyl,
   (2) 0 to about 100% by weight, relative to the organic pigment, of a surfactant, and
   (3) about 5 to about 15 parts by weight per part by weight of the organic pigment of a liquid in which the organic pigment is substantially insoluble,
   thereby forming a suspension of the surface-treated pigment composition in the liquid; and
(b) collecting the pigment composition.

9. A pigmented macromolecular material containing as pigment a pigment composition prepared according to a process comprising
   (a) treating an organic pigment with
      (1) about 0.1 to about 100% by weight, relative to the organic pigment, of a tertiary alkyl primary amine having the formula

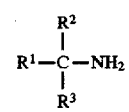

wherein
   $R^1$ is a $C_5$–$C_{30}$ (cyclo)aliphatic group, and
   $R^2$ and $R^3$ are independently $C_1$–$C_6$ alkyl,
   (2) 0 to about 100% by weight, relative to the organic pigment, of a surfactant, and (3) about 5 to about 15 parts by weight per part by weight of the organic pigment of a liquid in which the organic pigment is substantially insoluble, thereby forming a suspension of the surface-treated pigment composition in the liquid; and (b) collecting the pigment composition.

10. A pigmented coating composition containing as pigment a pigment composition prepared according to a process comprising (a) treating an organic pigment with (1) about 0.1 to about 100% by weight, relative to the organic pigment, of a tertiary alkyl primary amine having the formula

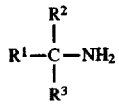

wherein $R^1$ is a $C_5$–$C_{30}$ (cyclo)aliphatic group, and
$R^2$ and $R^3$ are independently $C_1$–$C_6$ alkyl, (2) 0 to about 100% by weight, relative to the organic pigment, of a surfactant, and (3) about 5 to about 15 parts by weight per part by weight of the organic pigment of a liquid in which the organic pigment is substantially insoluble, thereby forming a suspension of the surface-treated pigment composition in the liquid; and (b) collecting the pigment composition.

11. A pigmented printing ink containing as pigment a pigment composition prepared according to a process comprising (a) treating an organic pigment with (1) about 0.1 to about 100% by weight, relative to the organic pigment, of a tertiary alkyl primary amine having the formula

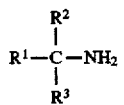

wherein $R^1$ is a $C_5$–$C_{30}$ (cyclo)aliphatic group, and
$R^2$ and $R^3$ are independently $C_1$–$C_6$ alkyl.

(2) 0 to about 100% by weight, relative to the organic pigment, of a surfactant, and (3) about 5 to about 15 parts by weight per part by weight of the organic pigment of a liquid in which the organic pigment is substantially insoluble, thereby forming a suspension of the surface-treated pigment composition in the liquid; and (b) collecting the pigment composition.

* * * * *